United States Patent [19]

Holter

[11] 4,300,440
[45] Nov. 17, 1981

[54] VENTILATING HATCH ASSEMBLY

[76] Inventor: John W. Holter, 2701 - 13th St., St. Petersburg, Fla. 33704

[21] Appl. No.: 799,199

[22] Filed: May 23, 1977

[51] Int. Cl.³ .............................................. E05D 15/50
[52] U.S. Cl. ........................................ 98/37; 98/2.14; 98/19; 114/201 R; 49/386; 49/382; 49/193; 49/465; 52/200
[58] Field of Search .................. 98/2, 2.14, 2.15, 8, 98/13, 19, 32, 37, 42, 85, 86, 114; 52/198, 199, 200; 49/382, 386, 193, 465; 114/201, 203

[56] References Cited

U.S. PATENT DOCUMENTS

| | | | |
|---|---|---|---|
| 2,372,164 | 3/1945 | Woodhams | 98/37 |
| 2,476,402 | 7/1949 | Cook | 114/201 |
| 2,755,727 | 7/1956 | Shoberg | 98/19 |
| 2,909,254 | 10/1959 | Hallock | 49/386 |
| 3,505,762 | 4/1970 | Sandow et al. | 49/386 |
| 3,665,661 | 5/1972 | Beckerer | 52/200 |
| 3,861,083 | 1/1975 | Groiot | 49/382 |
| 3,934,383 | 1/1976 | Perry et al. | 98/2.14 |

*Primary Examiner*—Henry C. Yuen
*Attorney, Agent, or Firm*—Richard D. Weber

[57] ABSTRACT

A ventilating hatch assembly for a boat deck or the like includes a square opening in the deck having a coaming extending therearound. A square frame having a hatch cover pivotally attached along one edge thereof is disposed over the opening and is demountably attached to the coaming. The frame and hatch cover may be removed from the coaming and selectively replaced at one of four ventilating positions spaced at 90° intervals.

7 Claims, 9 Drawing Figures

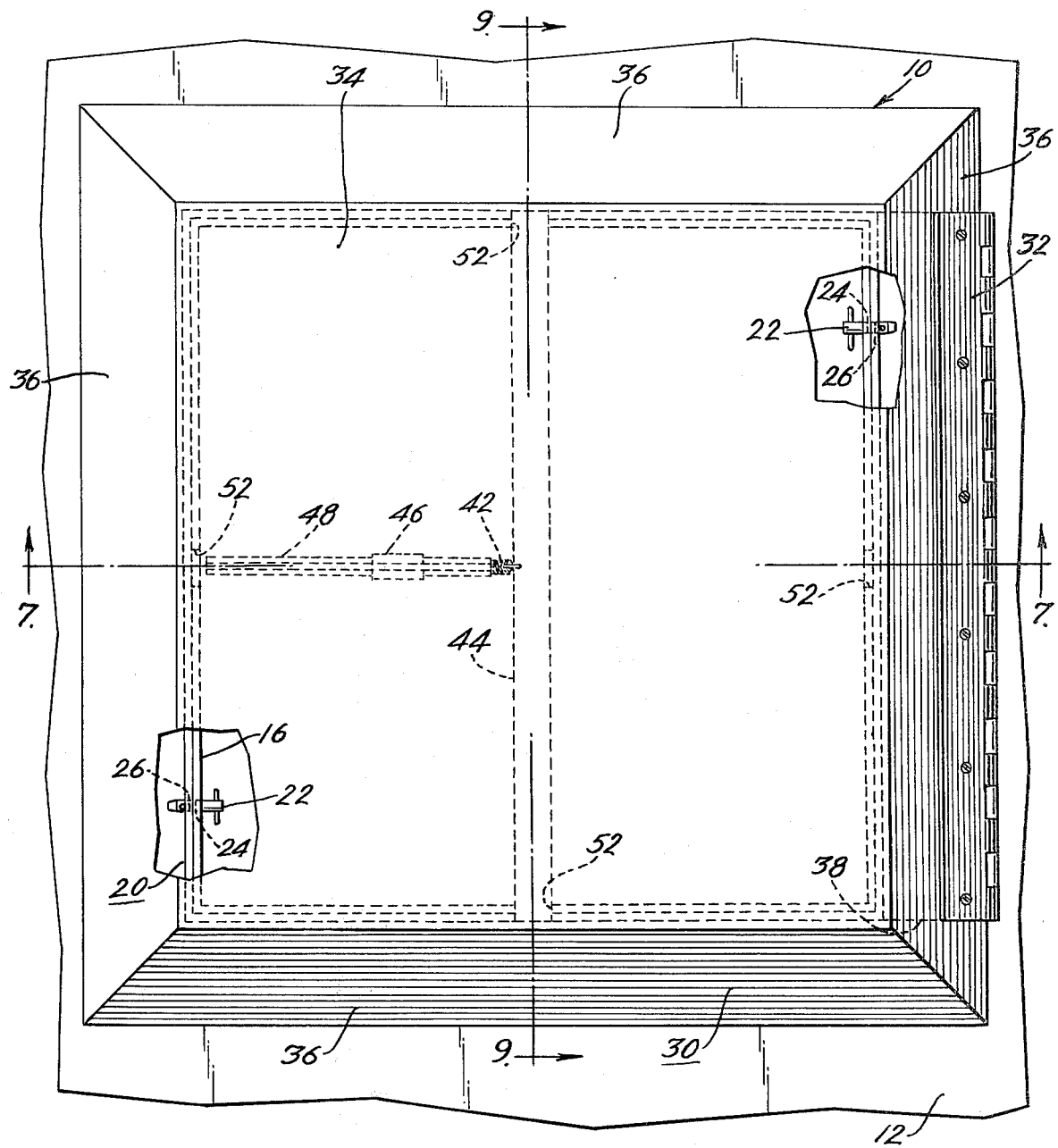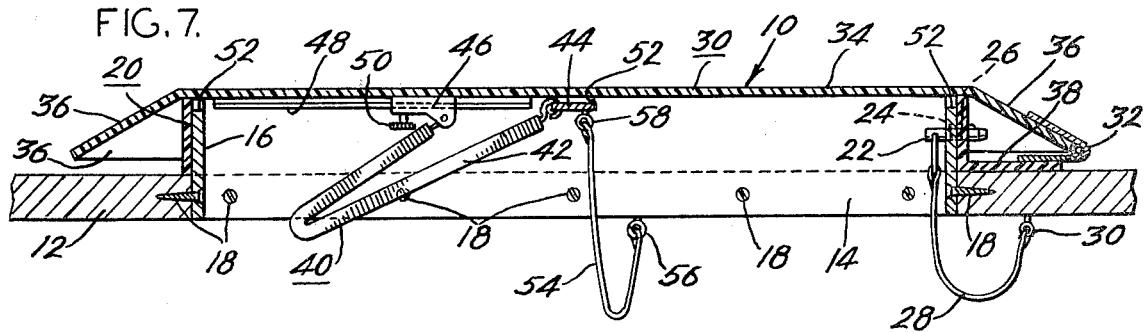

VENTILATING HATCH ASSEMBLY

BACKGROUND OF THE INVENTION

The present invention relates generally to ventilating hatches for boats, recreational vehicles, motor homes and the like and relates more particularly to a novel hatch construction which permits the selective opening of the hatch cover in any one of four directions.

The present invention is particularly suited for small boats which depend for cabin ventilation on deck mounted hatches. The typical hatch which the present invention is designed to replace comprises a hatch cover hinged along one edge to a coaming extending around a rectangular opening in the deck. Adjustable means are usually provided for holding the hatch cover open at a desired angle. Such a hatch on a small boat is typically mounted with the hatch cover hinged along the aft edge of the hatch opening so that the wind will be directed below deck when the boat rides at anchor.

Although under some circumstances the conventional hatch opening arrangement is satisfactory, there are many instances in which such a hatch is ineffective or must be closed due to the entrance of rain or spray. For example, if the boat is at anchor during a rain storm, the boat will be aligned with the wind direction and the hatch described will if opened to any extent direct water below decks. Similarly, if the boat were to be operated in rough seas in which spray were to come over the bow, the spray could directly enter the forward facing hatch if opened. In another situation, with the boat tied up at a dock with the wind abeam, the typical ventilator described would be ineffective in either directing air below, in pulling air from the boat, or in preventing rain entrance since the hatch cover would not be properly aligned with the wind direction.

For optimal use of the wind for ventilation the hatch cover should face so that its hinge axis is substantially perpendicular to the wind direction. If it is desired to direct air below deck, the hatch cover should open toward the direction from which the wind is blowing, whereas if it is desired to remove air from the boat, the hatch cover should open away from the wind direction. Obviously, the conventional hatch described can only be employed to optimize its ventilating capabilities by changing the heading of the boat with respect to the wind, and this is not usually possible or feasible.

In recognition of the inadequacy of the old style hatches which were fixedly hinged to open in only one direction, efforts have been made to develop a hatch wherein the hatch cover could be opened in either of two directions opposed 180°. In one simple but cumbersome arrangement, the hatch cover is provided with hinges along two opposite edges and the hinge pin is removed from the edge toward which the hatch is to be opened. A more sophisticated version of this concept is shown in U.S. Pat. No. 3,861,083, issued Jan. 21, 1975, which allows the same function but without the need for removal of the hinge pins.

Although the arrangements which permitted an optional opening direction of the hatch cover alleviated to some degree the problems of the single direction opening hatches, these hatches still were not effective for providing ventilation or for blocking the entrance of rain and spray when the wind direction or apparent wind direction lay parallel to the hinge axes. Furthermore, leakage has been a problem with hatches having alternate hinge axes.

SUMMARY OF THE INVENTION

In the present invention, the hatch assembly comprises a square opening in the deck provided with a coaming extending substantially above the surface of the deck. A square frame having a hatch cover pivotally connected to one side thereof is demountably secured over the opening adjacent the coaming. In the preferred embodiment, the frame and coaming are so dimensioned that one will nest within the other and the frame need only be secured against upward movement by readily detachable pins passing through the frame and coaming. The square configuration of the frame and coaming permits the selective positioning of the frame and hatch cover with respect to the opening in any of four positions spaced at 90° intervals. Adjustable means are provided to hold the hatch cover at the desired opened position.

It is accordingly a first object of the present invention to provide a ventilating hatch assembly for small boats and the like which is characterized by a hinged hatch cover which may be selectively arranged to open in any one of four directions to thereby provide a controlled ventilating air flow regardless of wind direction.

Another object of the invention is to provide a ventilating hatch assembly as described which by reason of its selective positioning capabilities can be directed so as to prevent or minimize the entrance of rain or spray into the underdeck space.

A further object of the invention is to provide a ventilating hatch assembly as described which may be quickly opened and/or removed to provide an escape hatch for emergency use.

Still another object of the invention is to provide a ventilating hatch assembly as described which in the closed position has a low profile and accordingly does not interfere with crew movement on deck.

An additional object of the invention is to provide a ventilating hatch assembly as described which provides some ventilation even in the closed position.

Still another object of the invention is to provide a ventilating hatch assembly as described which is relatively simple in construction and which can be economically manufactured and installed.

Additional objects and advantages of the invention will be more readily apparent from the following detailed description of an embodiment thereof.

BRIEF DESCRIPTION OF THE DRAWINGS

FIG. 6 is a plan view of the ventilating hatch assembly in the closed position with parts thereof broken away to show interior details;

FIG. 7 is a sectional view along line 7—7 of FIG. 6;

DESCRIPTION OF THE PREFERRED EMBODIMENT

Figure 1:
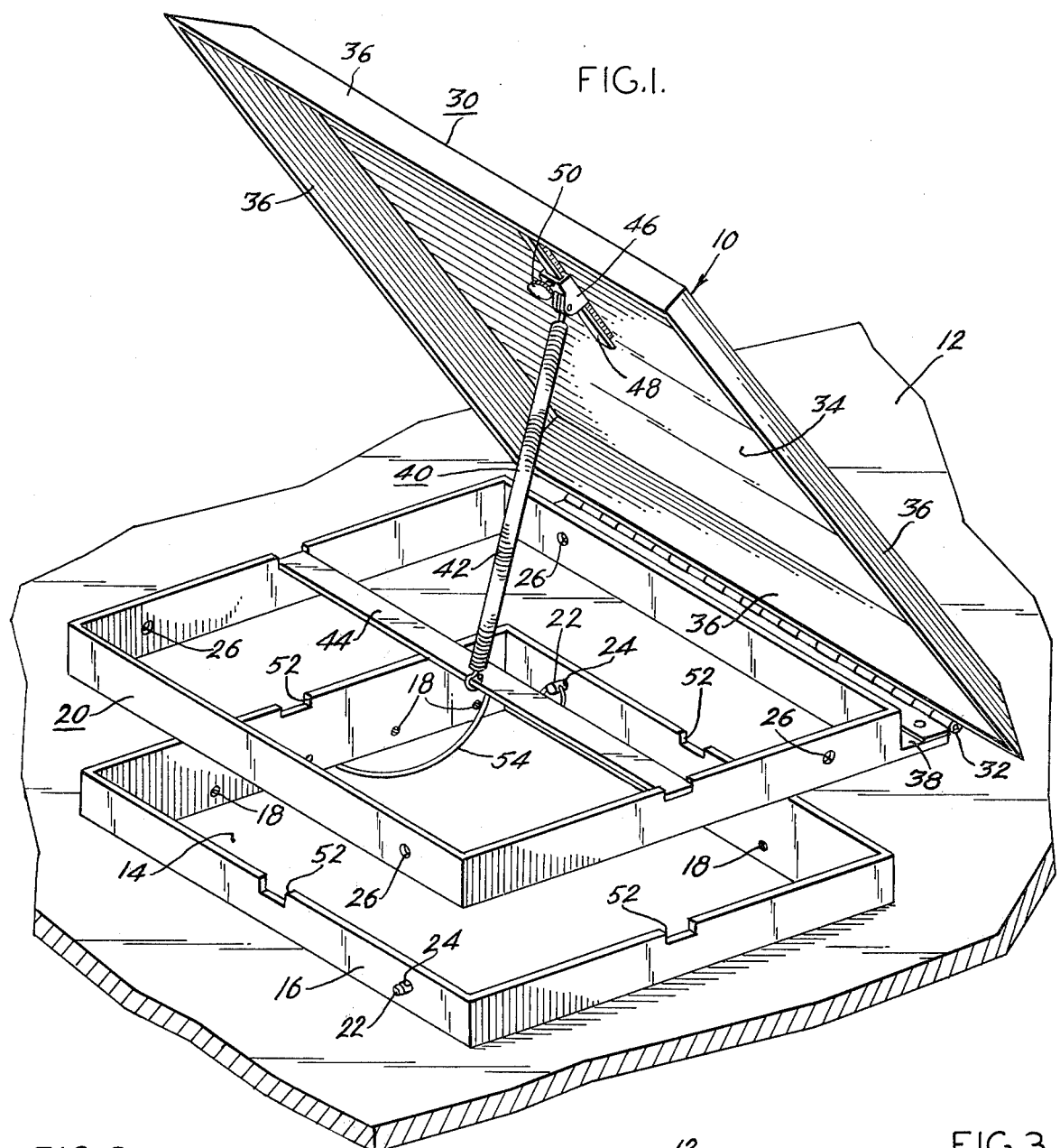
FIG. 1 is an isometric view of a ventilating hatch assembly in accordance with the present invention showing the hatch cover in an open position on the frame with the frame raised above the coaming.

Referring to the drawings, a ventilating hatch assembly generally designated 10 in accordance with the present invention is illustrated installed on the deck 12 of a boat for ventilating the space beneath the deck and for providing an escape hatch for occupants of the belowdeck space. Although described with reference to a boat deck, it will be evident that the present hatch assembly could also be utilized for the same purposes in recreational vehicles, motor homes, or for special situations in permanent buildings such as beach houses. The invention can be used with virtually any substantially horizontal floor or deck and its size may vary depending upon the ventilation requirements and its intended secondary use as a passageway for personnel or cargo.

The ventilating hatch assembly 10 includes a square opening 14 in the deck 12 provided around the edges thereof with a coaming 16 secured to the deck by screws 18. The coaming extends substantially above the surface of the deck and is fitted in water-tight relation therewith, thus serving as a dam to prevent water on the deck from passing into the opening 14.

Figure 8:
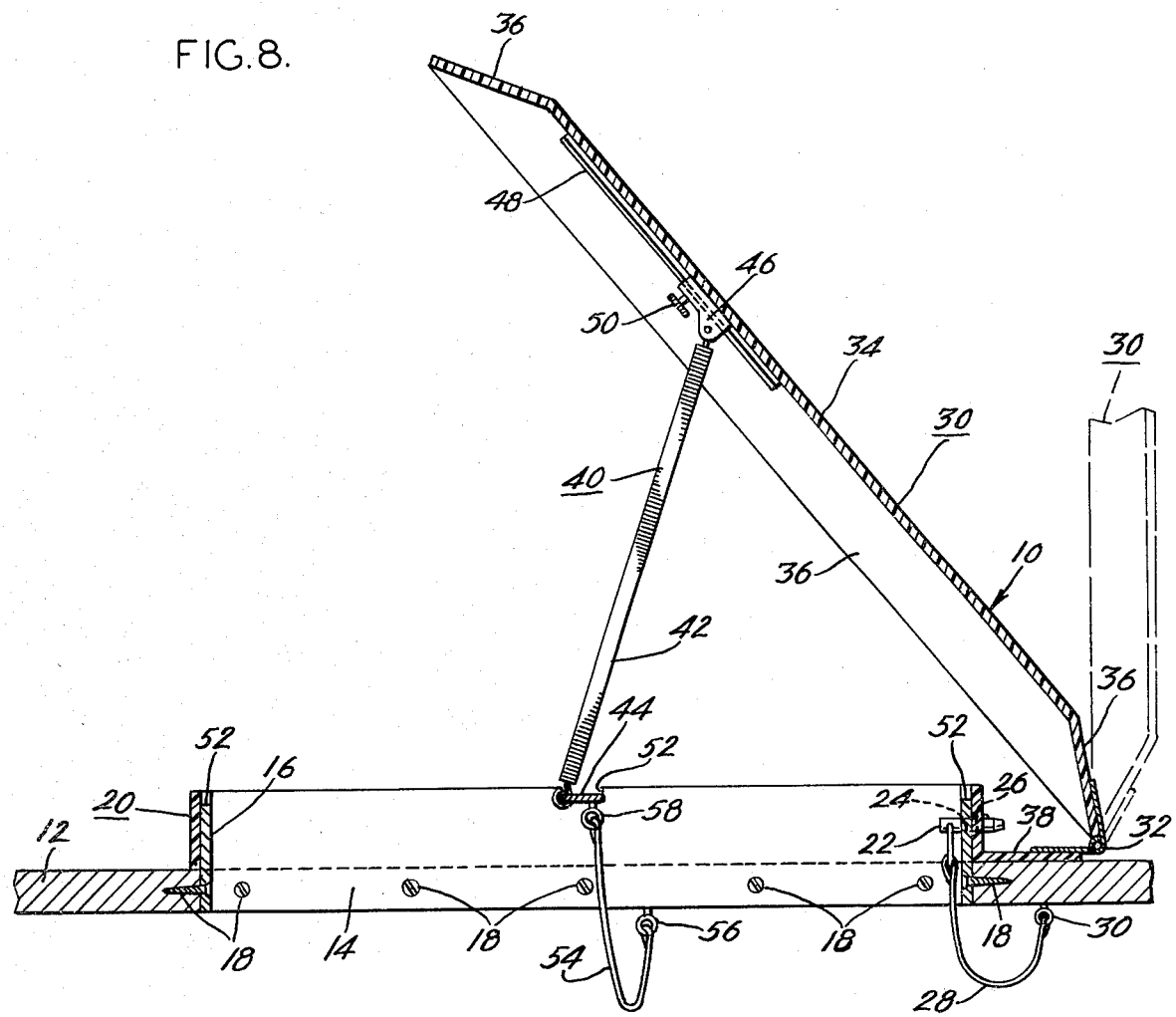
FIG. 8 is a view similar to FIG. 7 but with the hatch cover in a raised position and showing partially in broken lines a further open position of the cover.
Figure 9:
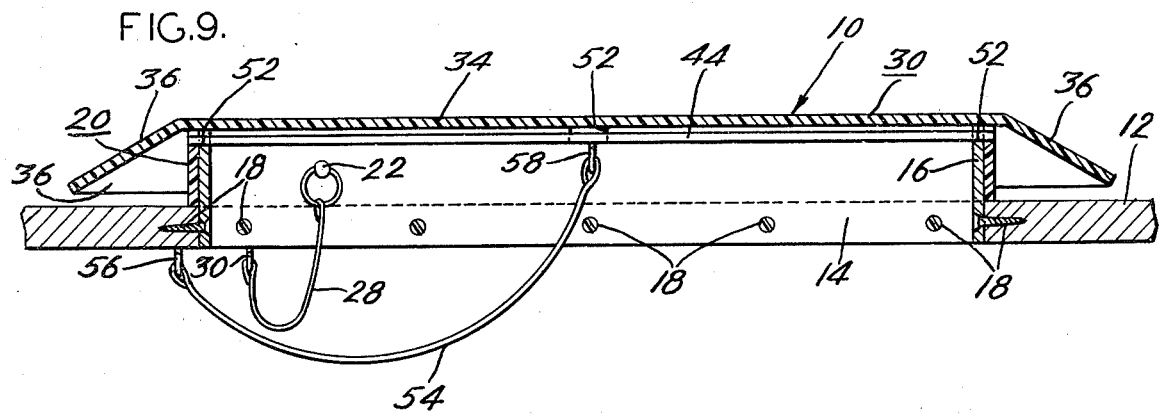
FIG. 9 is a sectional view taken along line 9—9 of FIG. 6.

The assembly 10 further includes a square hatch frame 20 dimensioned to fit closely but slidably around the coaming 16 and to rest on the deck as shown in FIGS. 7-9 in its attached position. Since the configurations of both the coaming and the hatch frame 20 are square, the frame may be selectively positioned over the coaming in any one of four positions rotationally spaced at 90° intervals. The frame 20 is detachably secured on the deck 12 by a pair of quick-release pins 22 passing through holes 24 in opposed sections of the coaming 16. Holes 26 provided in each side of the frame 20 align with the holes 24 to premit the passage of the pins 22 through both the frame and the coaming in any selected position of the frame. The pins 22 illustrated are of a well-known type sold under the trade name "Faspins" by Aerofast, Inc. of Wheaton, Ill. and are characterized by a spring loaded ball retainer at one end and a pull ring at the other. The pins 22 are connected by lanyards 28 to screw eyes 30 in the underside of the deck to prevent their becoming misplaced when withdrawn during the repositioning of the frame.

A hatch cover 30 is pivotally attached to the hatch frame 20 by a piano hinge 32. The hatch cover 30 has a square configuration with a substantially flat central portion 34 and downwardly beveled side edge portions 36 which in the closed position of the cover extend outwardly beyond the frame 20 with the edges thereof in close proximity to the deck as shown in FIG. 7 and 9. The hinge 32 is mounted with one leg thereof attached to the upper surface of one of the hatch cover edge portions 36 and the other leg thereof attached to a horizontally extending flange 38 extending from one side of the frame 20. This arrangement prevents interference between the cover and the deck when the cover is swung into the raised position as illustrated in FIG. 8.

Means are provided to maintain the hatch cover at a selected opening position. In the preferred form of the invention illustrated, this means comprises a spring assembly 40 including a tightly wound tension coil spring 42 attached at its lower end to a cross member 44 extending across the frame 20 and secured to opposed sides thereof, and at its upper end to a car 46 which may be selectively positioned on a track 48 by means of locking screw 50. The spring 42 is connected substantially at the center of the cross member 44 and the track 48 is centrally located and secured along the underside of the hatch cover 30 perpendicular to the hinge 32. For larger embodiments, it may be desirable to utilize a pair of the springs 42 one on each side of the frame to support the hatch cover in the open position.

Figure 4:
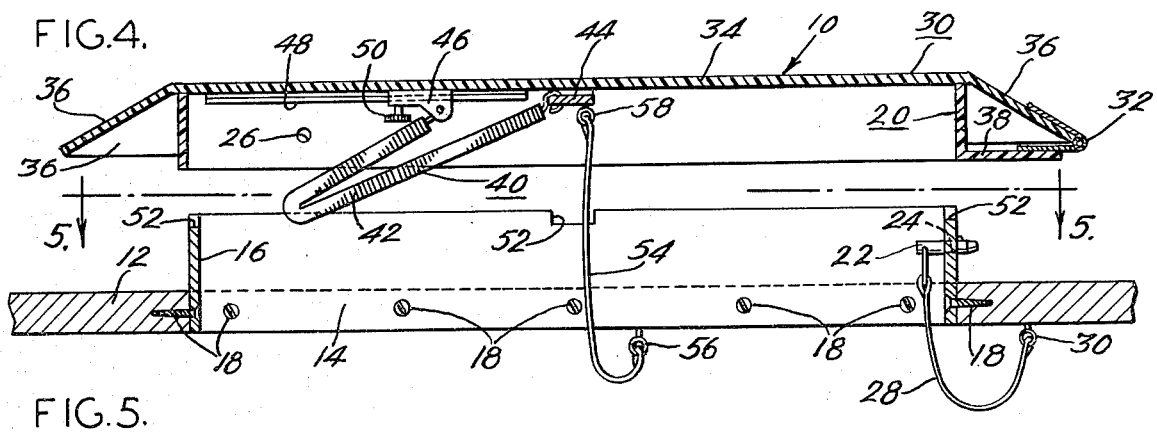
FIG. 4 is an enlarged sectional side elevational view of the ventilating hatch assembly of FIG. 1 showing the hatch cover in a closed position with respect to the frame and with the frame and hatch cover raised above the coaming.
Figure 5:
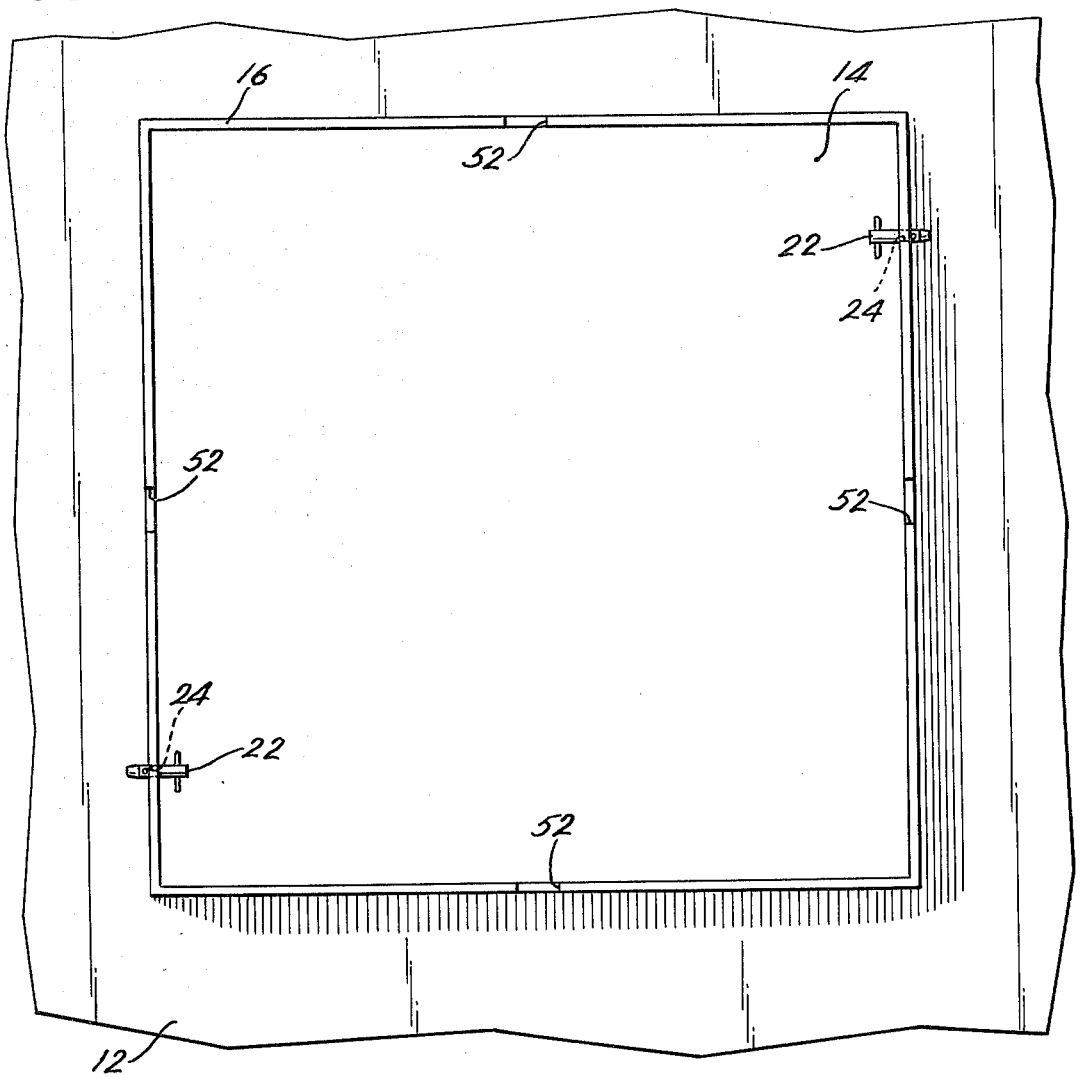
FIG. 5 is a plan view of the deck opening and coaming taken along line 5—5 of FIG. 4.

The spring assembly 40 is a known, commercially available arrangement for the purpose illustrated and has the advantageous function of permitting the hatch to be opened to a predetermined angle inasmuch as the spring will snap into place as that angle is reached. For closure, the spring is simply deformed from its normal straight configuration and will then readily bend into the shape shown in FIGS. 4 and 7 as the hatch cover is closed. Adjustment of the angle at which the hatch will be supported in the open position is readily made by loosening the screw 50 and sliding the car 46 along the track 48 to the desired position.

The cross member 44 serves as a convenient handle for lifting the frame 20 and attached hatch cover 30 for repositioning. To accommodate the cross member 44, slots 52 are provided in the sides of the coaming 16 at the mid-point of each side. Since the cross member 44 is centrally disposed in the frame 20, the slots 52 will accept the cross member in any of the four possible positions of the frame with respect to the coaming. A lanyard 54 extending between a screw eye 56 beneath the deck and a screw eye 58 centrally mounted on the cross member 44 prevents the hatch frame and cover from being swept out of reach or overboard by strong winds or a wave.

For ventilating use of the hatch assembly, the hatch cover 30 is raised from the closed position of FIGS. 6, 7 and 9 to an open position such as shown in FIG. 8. Should the opened angle of the hatch cover not be satisfactory, the angle may be adjusted by releasing the screw 50 and sliding the car 46 on the track 48 until the desired angle is reached, following which the screw 50 is retightened.

Figure 2:
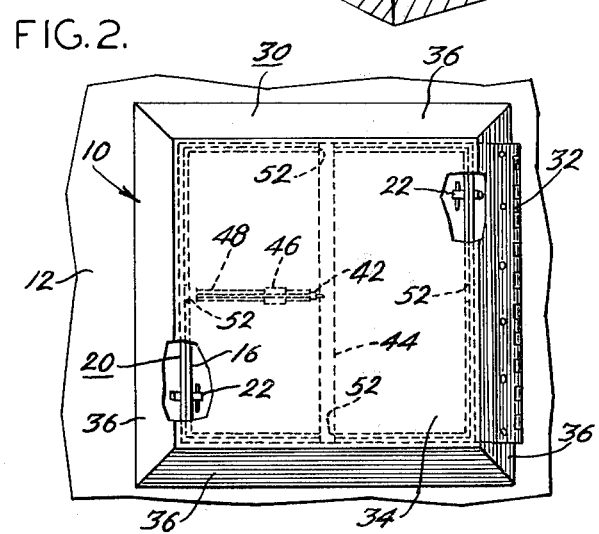
FIG. 2 is a reduced scale plan view of the ventilating hatch assembly of FIG. 1 shown secured to the coaming in a first position.
Figure 3:
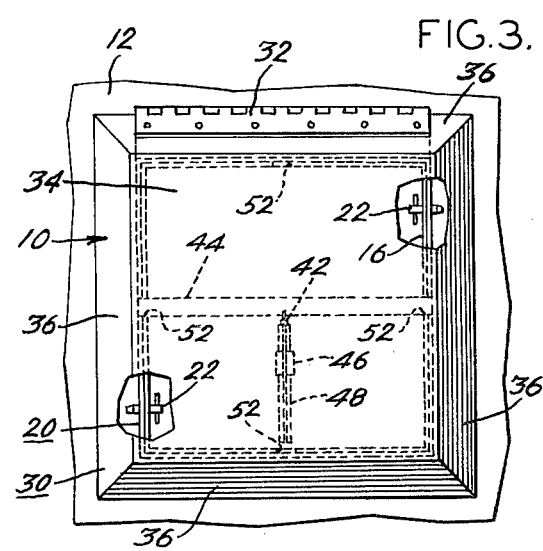
FIG. 3 is a view similar to FIG. 2 but showing the assembly in a second position rotated counterclockwise 90° from that shown in FIG. 2.

Should the direction in which the hatch cover is facing not prove satisfactory due either to the wind direction, or the entrance of spray or rain, the frame 20 and hatch cover 30 may be repositioned with respect to the deck and coaming by withdrawing the pins 22 and lifting and rotating the frame and hatch cover either 90° or 180° to a preferred position. The frame is then lowered over the coaming and the pins 22 reinserted. FIGS. 2 and 3 illustrate such a repositioning of the hatch, the frame and hatch cover being rotated 90° counterclockwise from the position shown in FIG. 2 to the position of FIG. 3. Alternatively, the frame and hatch cover could be rotated 90° clockwise, or to a position 180° from its original position should conditions so warrant.

For use of the hatch as an escape hatch or for loading or unloading gear, the hatch frame and cover may be removed from the coaming following removal of the pins 22 and set aside on the deck to provide an unobstructed path through the deck opening. The lanyard 54 should be of sufficient length to permit such temporary removal of the frame and cover but should not be so long as to prevent easy reach of the assembly from within the hatch opening. It will be appreciated that the cross member 44 is not essential although it is convenient in serving both as a handle and as a base for the hatch cover support. In embodiments in which the cross member is eliminated, the hatch can be used as an escape hatch or for loading and unloading purposes without the need for removal of the frame and hatch cover. For such use, the hatch cover may simple be pivoted to its full open position.

Although seals have not been shown around the edge of the coaming to cooperate with the hatch cover in the closed position of the hatch, suitable resilient seals could obviously be employed if desired to achieve a totally watertight and airtight closure of the hatch. It has been found, however, that embodiments of the invention without seals provide some ventilation even in the closed position of the hatch cover without permitting entrance of rain or spray. The height of the coaming, the substantial overhang of the hatch cover and the proximity of the hatch cover edges to the deck combine to prevent water from penetrating between the hatch cover and the upper edge of the coaming. Should the hatch assembly be employed in situations in which the deck might be flooded by heavy seas, the addition of seals would prevent water entrance even under such severe conditions.

In the illustrated embodiment, the hatch frame fits over the outside of the coaming and rests on the deck. In another embodiment (not shown) the hatch frame fits inside the coaming and rests on a narrow flange provided at the lower edge of the coaming. The structure and operation of this modified embodiment are otherwise substantially identical to that described.

Although the preferred material for fabrication of the hatch frame and cover is a strong molded plastic which is highly resistant to outdoor exposure and requires little maintenance, the hatch assembly could be alternatively made of metal or wood and the hatch cover may be fabricated partially or entirely of a transparent or translucent material to serve as a light source for the area below deck.

The present hatch assembly requires no special hardward and the hinge, quick release pins, and hatch cover adjustment means illustrated are conventional commercially available items. It will be apparent that other types of conventional hinges, quick release devices, or hatch cover adjustment means could be readily substituted.

Although means have not been illustrated for securing the hatch cover in the closed position, such means would normally be employed and conventional types of fasteners are suitable for this purpose. Such fasteners may take the form of the conventional toggle fasteners such as shown in U.S. Pat. No. 3,861,083 for securing the hatch cover to the frame, or may simply comprise a fastening such as a bolt passing from the hatch cover through the cross member 44. This latter fastening arrangement is preferred since it would not require modification of the coaming and would permit the removal or repositioning of the frame and hatch cover without removal of the fastening securing the hatch cover to the frame cross member.

From the foregoing, it will be recognized that the present invention provides a ventilating hatch assembly of a simple design which can be economically manufactured and which provides unique functional advantages which have not heretofore been available even with relatively expensive and complex hatch arrangements. In particular, the capability of opening the hatch in any of four directions permits the optimal use of the prevailing winds for ventilating purposes while minimizing the entrance of rain or spray.

Manifestly, changes in details of construction can be effected by those skilled in the art without departing from the spirit and scope of the present invention.

I claim:

1. A ventilating and escape hatch assembly for selectively providing ventilation to the space below a substantially horizontal deck or the like as well as an escape passage therefrom, comprising a square opening in the deck, a coaming around said opening having a square plan configuration, said coaming extending substantially above the deck and being permanently secured thereto in water-tight sealed relation therewith, a square hatch frame demountably disposed in cooperative mating relation with said coaming, said coaming and hatch frame having accurately square dimensions permitting the selective 90° or 180° repositioning of said frame with respect to said coaming, a hatch cover pivotally attached along one edge thereof to one side of said frame for selective rotation with respect thereto about a substantially horizontal axis, and quick release means actuatable from below said deck for detachably securing said frame to said coaming thereby permitting said frame and attached cover to be quickly removed to provide an escape passage or to be repositioned with respect to said coaming for optimal ventilation.

2. The invention as claimed in claim 1 wherein said means for detachably securing said frame to said coaming comprises at least one quick release pin, and aligned holes in said frame and coaming for receiving said pin in any selected position of said frame with respect to said coaming.

3. The invention as claimed in claim 1 wherein said hatch cover includes downwardly beveled side edge portions which in the closed position of the cover extend beyond said frame with the edges thereof in close proximity to the deck.

4. The invention as claimed in claim 1 including adjustable means foor supporting said hatch cover in a selected open position.

5. The invention as claimed in claim 4 including a cross member extending centrally between opposed sides of said frame for supporting said adjustable means.

6. The invention as claimed in claim 1 including flexible restraining means for preventing the disassociation of said frame and hatch cover from said opening and coaming.

7. The invention as claimed in claim 6 wherein said restraining means comprises a lanyard.

* * * * *